(12) United States Patent
Jia et al.

(10) Patent No.: US 12,123,945 B2
(45) Date of Patent: Oct. 22, 2024

(54) MULTI-SCAN SENSOR FUSION FOR OBJECT TRACKING

(71) Applicant: Aptiv Technologies AG, Schaffhausen (CH)

(72) Inventors: Bin Jia, Columbia, MD (US); Xiaohui Wang, Oak Park, CA (US)

(73) Assignee: Aptiv Technologies AG, Schaffhausen (CH)

( * ) Notice: Subject to any disclaimer, the term of this patent is extended or adjusted under 35 U.S.C. 154(b) by 471 days.

(21) Appl. No.: 17/651,420

(22) Filed: Feb. 16, 2022

(65) Prior Publication Data

US 2023/0314599 A1 Oct. 5, 2023

(51) Int. Cl.
*G01S 13/931* (2020.01)
*B60W 50/02* (2012.01)
(Continued)

(52) U.S. Cl.
CPC ....... *G01S 13/931* (2013.01); *B60W 50/0205* (2013.01); *B60W 60/001* (2020.02); *G01S 13/86* (2013.01); *B60W 2420/403* (2013.01); *B60W 2420/408* (2024.01); *B60W 2520/06* (2013.01); *B60W 2554/404* (2020.02); *B60W 2554/4044* (2020.02)

(58) Field of Classification Search
CPC .... G01S 13/931; G01S 13/86; B60W 60/001; B60W 50/0205; B60W 2554/4044; B60W 2554/404; B60W 2420/408; B60W 2420/403; B60W 2520/06
See application file for complete search history.

(56) References Cited

U.S. PATENT DOCUMENTS

| | | | | |
|---|---|---|---|---|
| 2018/0089538 | A1* | 3/2018 | Graham | G06V 20/56 |
| 2019/0293782 | A1* | 9/2019 | Suryanaryana | G01S 7/41 |
| 2021/0233261 | A1* | 7/2021 | Aeberhard | G01S 15/931 |

FOREIGN PATENT DOCUMENTS

| | | | | |
|---|---|---|---|---|
| DE | 102017207790 A1 * | 11/2018 | | B60W 40/02 |

OTHER PUBLICATIONS

Communication pursuant to Article 94(3) EPC issued Jun. 25, 2024 in European Applicatiobn No. 23154293.7.
(Continued)

*Primary Examiner* — Vivek D Koppikar
*Assistant Examiner* — Jeffrey R Chalhoub
(74) *Attorney, Agent, or Firm* — Harness, Dickey & Pierce, P.L.C.

(57) ABSTRACT

This document describes techniques, systems, and methods for multi-scan sensor fusion for object tracking. A sensor-fusion system can obtain radar tracks and vision tracks generated for an environment of a vehicle. The sensor-fusion system maintains sets of hypotheses for associations between the vision tracks and the radar tracks based on multiple scans of radar data and vision data. The set of hypotheses include mass values for the associations. The sensor-fusion system determines a probability value for each hypothesis. Based on the probability value, matches between radar tracks and vision tracks are determined. The sensor-fusion system then outputs the matches to a semi-autonomous or autonomous driving system to control operation of the vehicle. In this way, the described techniques, systems, and methods can provide high-precision object tracking with quantifiable uncertainty.

20 Claims, 8 Drawing Sheets

| | $T_{v_1}$ | $T_{v_2}$ | $T_{v_3}$ | ... | $T_{v_N}$ | Y |
|---|---|---|---|---|---|---|
| $T_{r_1}$ | $p_{11}$ | $p_{12}$ | $p_{13}$ | ... | $p_{1N}$ | $p_{1Y}$ |
| $T_{r_2}$ | $p_{21}$ | $p_{22}$ | $p_{23}$ | ... | $p_{2N}$ | $p_{2Y}$ |
| ⋮ | ⋮ | ⋮ | ⋮ | ⋱ | ⋮ | ⋮ |
| $T_{r_M}$ | $p_{M1}$ | $p_{M2}$ | $p_{M3}$ | ... | $p_{MN}$ | $p_{MY}$ |

(51) Int. Cl.
    *B60W 60/00*        (2020.01)
    *G01S 13/86*        (2006.01)

(56) References Cited

OTHER PUBLICATIONS

Denoeux, et al., "Optimal Object Association in the Dempster-Shafer Framework", IEEE Transactions on Cybernetics, Apr. 29, 2014, 12 pages.
Laghmara, et al., "Heterogeneous Sensor Data Fusion for Multiple Object Association using Belief Functions", Jul. 17, 2019, 42 pages.
Zhu, et al., "Track-to-Track Association by Coherent Point Drift", IEEE Signal Processing Letters, vol. 24, No. 5, May 2017, pp. 643-647.
"Extended European Search Report", EP Application No. 23154293.7, May 25, 2023, 11 pages.
Kurdej, et al., "Controlling Remanence in Evidential Grids Using Geodata for Dynamic Scene Perception", Jun. 7, 2013, 34 pages.
Magnier, et al., "Implementation of a Multi-criteria Tracking based on the Dempster-Shafer Theory", 2015 IEEE Intelligent Vehicles Symposium (IV), Jun. 28, 2015, pp. 463-468.

* cited by examiner

MULTI-SCAN SENSOR FUSION FOR OBJECT TRACKING

BACKGROUND

In some automobiles, a sensor fusion system or tracker combines information obtained from multiple sensors to track objects and support autonomous or semi-autonomous driving functions. Some sensor fusion systems combine data from various sensor types (e.g., vision, radar, lidar). When more than one type of sensor is available (e.g., radar and vision), track-to-track fusion (T2TF) of the sensor data sets can produce more accurate or robust estimates of objects in an instrument field of view than if only one of the sensor data sets (e.g., either radar or vision) is used. Existing T2TF techniques may apply observations to track associations but are generally too computationally complex for many vehicle systems. Expensive processing hardware may also be needed to perform these T2TF techniques. In addition, uncertainties in estimates from existing T2TF systems may not be quantifiable, or if quantifiable, they still may not satisfy safety regulations that govern their use for autonomous or semi-autonomous driving functions.

SUMMARY

This document describes techniques, systems, and methods for multi-scan sensor fusion for object tracking. For example, this document describes a method that includes obtaining radar tracks and vision tracks generated for an environment of a vehicle. The radar tracks are generated from radar data from radar sensors on the vehicle. Similarly, the vision tracks are generated from vision data from vision sensors on the vehicle. The radar and vision sensors have fields of view that at least partially overlap. The method also includes maintaining at least one set of hypotheses for associations between the vision tracks and the radar tracks based on multiple radar and vision data scans. The hypotheses include mass values for the associations between the vision and radar tracks. The method further includes determining a probability value for each hypothesis that indicates a likelihood that each hypothesis is accurate. Based on the probability value, one or more matches between radar and vision tracks are determined based on probability values exceeding a decision threshold. Finally, the method includes outputting the matches to a semi-autonomous or autonomous driving system to control the vehicle's operation. In this way, the described method can provide high-precision object tracking with quantifiable uncertainty, satisfying stringent requirements of even some of the most advanced driver-assistance and autonomous driving systems.

To execute the example method, an example system includes one or multiple processors configured to perform this method or a computer-readable storage media having instructions that, when executed, configure one or multiple processors to perform this method. The example system can additionally or separately include means for performing this method.

This document also describes other operations of the above-summarized method and other systems set forth herein, as well as means for performing these methods.

This Summary introduces simplified concepts related to multi-scan sensor fusion for object tracking, further described below in the Detailed Description and Drawings. This Summary is not intended to identify essential features of the claimed subject matter, nor is it intended to determine the scope of the claimed subject matter.

BRIEF DESCRIPTION OF THE DRAWINGS

The details of one or more aspects of multi-scan sensor fusion for object tracking are described in this document concerning the following figures. The same numbers are used throughout the drawings to reference similar features and components.

FIGS. 7-1 and 7-2 depict the use of multiple-scan windows to perform multi-scan sensor fusion for object tracking in accordance with this disclosure.

DETAILED DESCRIPTION

Overview

Figure 1:
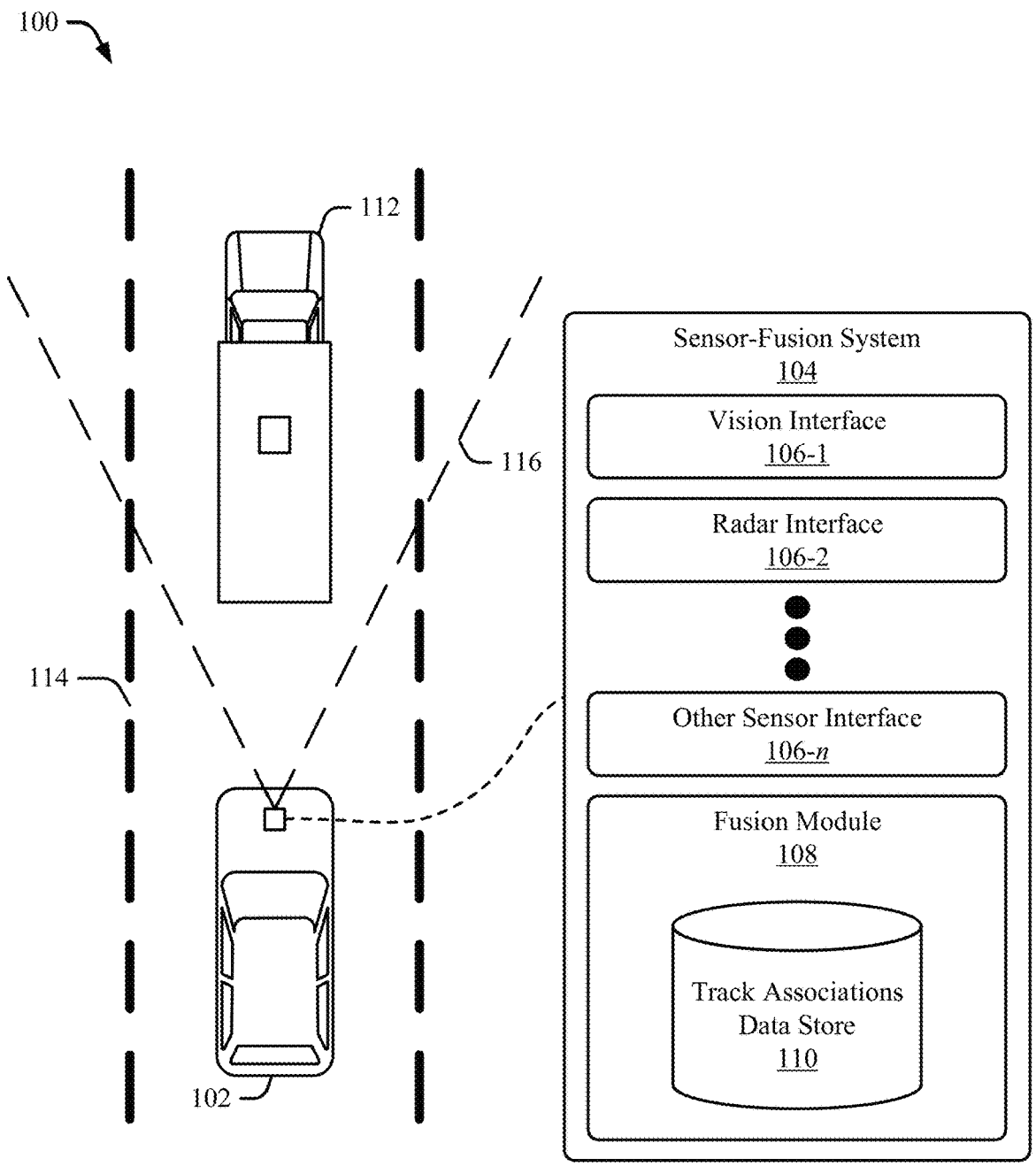
FIG. 1 illustrates an example environment in which a vehicle is equipped with a sensor-fusion system that performs multi-scan sensor fusion for object tracking in accordance with this disclosure.

Sensor-fusion systems are an important technology for assisted-driving and autonomous-driving systems. Some driving systems use data from multiple types of sensors (e.g., radar systems, lidar systems, vision systems) to monitor objects in an environment of a host vehicle. Advanced driver-assistance systems (e.g., adaptive cruise control (ACC), automatic emergency braking (AEB)), and autonomous-driving systems match tracks from different types of sensors (e.g., radar tracks and vision tracks) to track objects with a high level of precision. Such T2TF techniques are also critical for driving-scene understanding, trajectory planning, and control operations for these advanced driver-assistance and autonomous-driving systems.

Some sensor-fusion systems use T2TF techniques that use a single data scan to match one set of tracks (e.g., radar tracks) to another (e.g., vision tracks). Often the tracks from one sensor type (e.g., radar tracks) are forced to match or associate with the other set of tracks (e.g., vision tracks). Such systems and methodologies cannot generally associate multiple tracks from one sensor type (e.g., multiple radar tracks) to a single track from another sensor type (e.g., a single vision track). In addition, these systems are generally complex, with many ad-hoc parameters involved in the fusion methodology.

In contrast, this document describes less complex and more accurate sensor-fusion techniques and systems to perform T2TF. For example, these techniques and systems can use information from multiple scans to provide a more-nuanced environmental view that supports numerous hypothesis associations between radar tracks and vision tracks (or other tracks from other sensor types). In addition, these techniques and systems can use Dempster-Shafer theory to determine a belief parameter and plausibility parameter for the hypotheses. In this way, the described methods and systems can quantify uncertainty in associations between radar and vision tracks and better fulfill requirements for advanced driver-assistance systems and autonomous-driving systems.

For example, this document describes techniques to perform multi-scan sensor fusion for object tracking. A sensor-fusion system of a vehicle can obtain radar tracks and vision tracks generated for an environment. The sensor-fusion system maintains sets of hypotheses for associations between the vision tracks and the radar tracks based on multiple scans of radar data and vision data. The sets of hypotheses include mass values for the associations. The sensor-fusion system determines a probability value for each hypothesis. Based on the probability value, matches between radar tracks and vision tracks are determined. The sensor-fusion system then outputs the matches to a semi-autonomous or autonomous driving system to control the vehicle's operation. In this way, the described techniques, systems, and methods can provide high-precision obstacle tracking with quantifiable uncertainty.

This section describes just one example of how the described techniques, systems, and methods can perform multi-scan sensor fusion for object tracking. This document describes other examples and implementations.

Operating Environment

FIG. 1 illustrates an example environment 100 in which a vehicle 102 is equipped with a sensor-fusion system 104 that performs multi-scan sensor fusion for object tracking in accordance with this disclosure. Vehicle 102 can represent any apparatus or machinery, including operated and unmanned systems used for various purposes. Some non-exhaustive and non-limiting examples of the vehicle 102 include other motorized vehicles (e.g., a motorcycle, a bus, a tractor, a semi-trailer truck, watercraft, aircraft, or construction equipment).

In the depicted environment 100, the sensor-fusion system 104 is mounted to, or integrated within, the vehicle 102. Vehicle 102 can travel on a roadway 114 and use the sensor-fusion system 104 to navigate the environment 100. Objects may be in proximity to the vehicle 102. For example, FIG. 1 depicts another vehicle 112 traveling in front of and in the same direction as the vehicle 102 along the roadway 114.

With the sensor-fusion system 104, vehicle 102 has an instrumental or sensor field of view 116 that encompasses the other vehicle 112. The sensors (e.g., radar systems, vision systems) can have the same, similar, or different instrumental fields of view 116 of the roadway 114. For example, a vision system can project an instrumental field of view 116-1 (not illustrated in FIG. 1). A radar system can project an instrumental field of view 116-2 (not shown in FIG. 1) from any exterior surface of the vehicle 102. Vehicle manufacturers can integrate at least a part of a vision system or radar system into a side mirror, bumper, roof, or any other interior or exterior location where the field of view 116 includes the roadway 114. In general, vehicle manufacturers can design the sensors' location to provide a field of view 116 that sufficiently encompasses the roadway 114 on which vehicle 102 may be traveling. For example, the sensor-fusion system 104 can monitor the other vehicle 112 (as detected by the sensor systems) on the roadway 114 in which the vehicle 102 is traveling.

The sensor-fusion system 104 includes a fusion module 108 and one or more sensor interfaces 106, including a vision interface 106-1 and a radar interface 106-2. The sensor interfaces 106 can include additional sensor interfaces, including another sensor interface 106-$n$, where n represents the number of sensor interfaces. For example, the sensor-fusion system 104 can include interfaces to other sensors (e.g., lidar systems) or other vision systems or radar systems. Although not illustrated in FIG. 1, the fusion module 108 executes on a processor or other hardware. During execution, the fusion module 108 can track objects based on sensor data obtained at the vision interface 106-1 and the radar interface 106-2. The vision interface 106-1 receives vision or camera data from one or more vision systems of the vehicle 102. The radar interface 106-2 receives radar data from one or more radar systems of the vehicle 102. In particular, the fusion module 108 can access the vision interface 106-1 and the radar interface 106-2 to obtain the vision data and the radar data, respectively.

The fusion module 108 configures the sensor-fusion system 104 to combine the different types of sensor data obtained from the sensor interfaces 106 into vision tracks and radar tracks (not illustrated in FIG. 1) for tracking objects in the field of view 116. The fusion module 108 can determine a plurality of object tracks according to first sensor data (e.g., obtained from the vision interface 106-1) and identifies another plurality of object tracks according to second sensor data (e.g., obtained from the radar interface 106-2). Alternatively, the fusion module 108 receives the vision tracks and radar tracks via the sensor interfaces 106 from the respective sensor systems. The fusion module 108 can determine associations between the vision and radar tracks and maintain or store the associations in a track associations data store 110.

The fusion module 108 can, for example, use a sliding window with multiple scans of sensor data to create associations between tracks generated by different types of sensor systems. The track associations can be stored in the track associations data store 110. For example, the sensor-fusion system 104 can create associations for one or more vision tracks collected or obtained by the vision interface 106-1 with one or more radar tracks collected or obtained by the radar interface 106-2. A single scan of the environment 100 often lacks sufficient contextual information necessary to provide a nuanced environmental view. Because insufficient evidence to support multiple hypothesis association may be obtained from one individual scan, the fusion module 108 uses a sliding window with multiple scans of sensor data to create the associations between tracks.

The fusion module 108 can determine multiple hypotheses for one or more associations. The fusion module 108 can also combine mass values using the Dempster-Shafer theory applied to the multiple hypotheses and generate a fused mass value. The Dempster-Shafer theory provides a framework for determining and reasoning with uncertainty among multiple hypotheses. The Dempster-Shafer theory enables evidence from different sources (e.g., radar tracks and vision tracks) to be combined to arrive at a degree of belief for a hypothesis when considering all available evidence. Each given hypothesis is included in a frame of discernment. Applying Dempster-Shafer theory to sensor fusion is sometimes referred to as Dempster-Shafer fusion. Using Dempster-Shafer fusion, the sensor-fusion system 104 can also output a belief parameter (e.g., likelihood) and a plausibility parameter (e.g., confidence) associated with each of the one or more hypotheses based on the fused mass value. This document describes the operations and components of the sensor-fusion system 104 and the fusion module 108 in greater detail with respect to FIGS. 2 through 8.

Vehicle 102 can also include one or more vehicle-based systems (not illustrated in FIG. 1) that can use the track assignments, the belief parameters, and the plausibility parameters from the sensor-fusion system 104 to operate the vehicle 102 on the roadway 114. The vehicle-based systems can include an assisted-driving system and an autonomous-driving system (e.g., an Automatic Cruise Control (ACC) system, Traffic-Jam Assist (TJA) system, Lane-Centering Assist (LCA) system, and L0-L4 Autonomous Driving system). Generally, the vehicle-based systems can use the track assignments provided by the sensor-fusion system 104 to operate the vehicle and perform particular driving functions. For example, the assisted-driving system can provide automatic cruise control and monitor for the presence of the other vehicle 112 in the lane or an adjacent lane in which the vehicle 102 is traveling. As another example, the assisted-driving system can provide alerts when the other vehicle 102 crosses a lane marker into the same lane as the vehicle 102.

The autonomous-driving system may move the vehicle 102 to a particular location on the roadway 114 while avoiding collisions with objects and the other vehicle 112 detected by the different systems (e.g., a radar system and a vision system) on the vehicle 102. The track assignments provided by the sensor-fusion system 104 can provide information about the location and trajectory of the other vehicle 112 to enable the autonomous-driving system to perform a lane change or steer the vehicle 102.

Example Architecture

Figure 2:
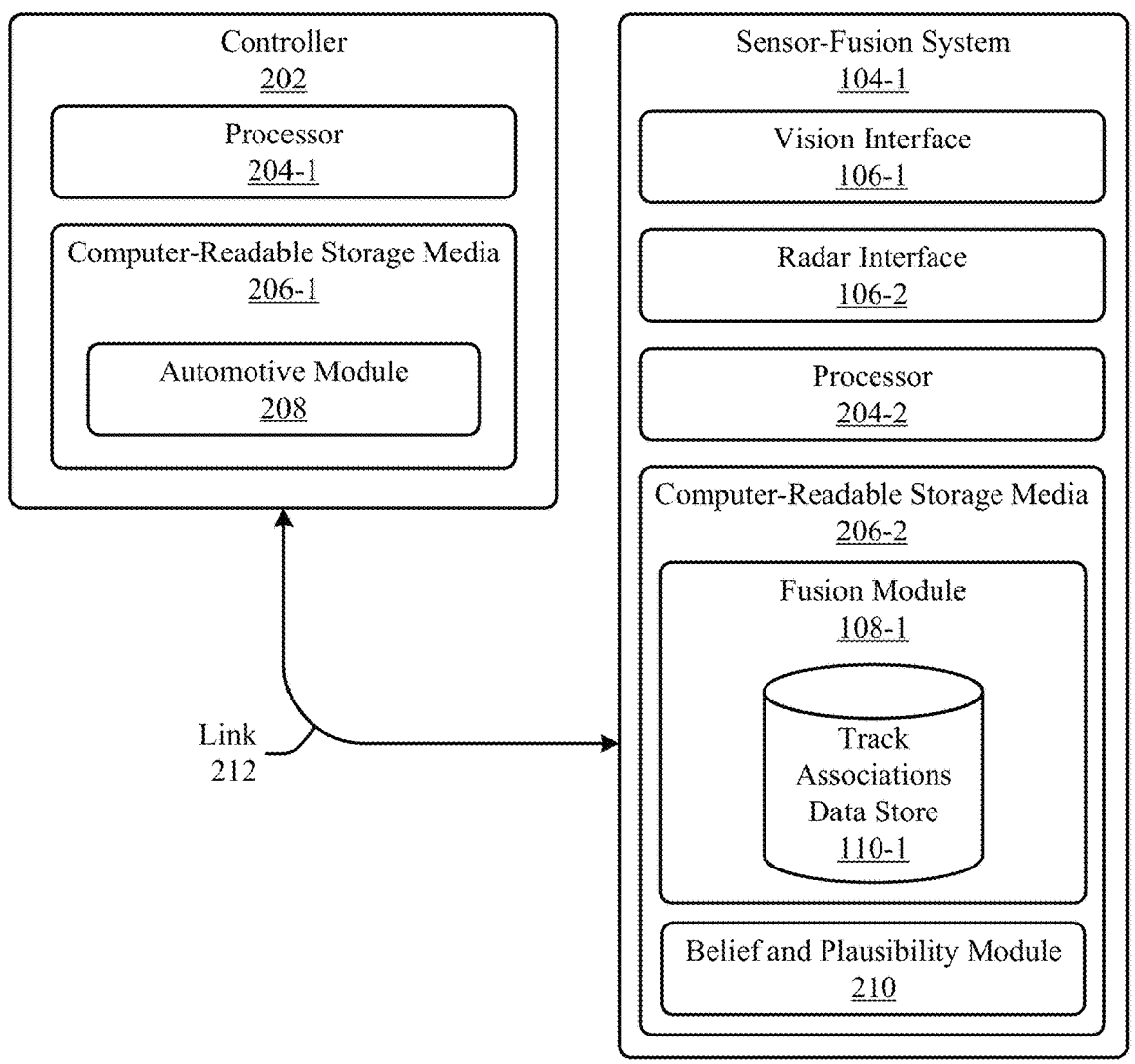
FIG. 2 illustrates an example automotive system configured to perform multi-scan sensor fusion for object tracking in accordance with techniques of this disclosure.

FIG. 2 illustrates an example automotive system 200 configured to perform multi-scan sensor fusion for object tracking in accordance with techniques of this disclosure. The automotive system 200 can be integrated within the vehicle 102 shown in FIG. 1 and is described in that context. For example, the automotive system 200 includes a controller 202 and a sensor-fusion system 104-1, which is an example of the sensor-fusion system 104 of FIG. 1. The sensor-fusion system 104-1 and the controller 202 communicate over a link 212. Link 212 may be wired or wireless and includes a communication bus in some cases. The controller 202 performs operations based on information received over the link 212, such as belief parameters and plausibility parameters for multiple hypotheses output from the sensor-fusion system 104-1 as objects in the field of view 116 are identified from processing and associating radar tracks and vision tracks.

The controller 202 includes a processor 204-1 (e.g., a hardware processor, a processing unit) and a computer-readable storage medium (CRM) 206-1 (e.g., a memory, long-term storage, short-term storage) that stores instructions for an automotive module 208.

The sensor-fusion system 104-1 includes the vision interface 106-1 and the radar interface 106-2. As discussed above, any number of other sensor interfaces 106 may be used, including a lidar interface or other sensor interface 106-n. The sensor-fusion system 104-1 may include processing hardware that includes a processor 204-2 (e.g., a hardware processor, a processing unit) and a CRM 206-2 that stores instructions associated with a fusion module 108-1, which is an example of the fusion module 108 of FIG. 1, and a belief and plausibility module 210. The fusion module 108-1 includes a track associations data store 110-1.

The processors 204-1 and 204-2 can be two separate processing units or a single processing unit (e.g., a microprocessor). The processors 204-1 and 204-2 can also be a pair of or a single system-on-chip of a computing device, a controller, or a control unit. The processors 204-1 and 204-2 execute computer-executable instructions stored within the CRMs 206-1 and 206-2. As an example, the processor 204-1 can execute the automotive module 208 to perform a driving function (e.g., an autonomous lane change maneuver, a semi-autonomous lane-keep feature, an ACC function, a TJA function, an LCA function, or other autonomous or semi-autonomous driving functions) or other operations of the automotive system 200. Similarly, the processor 204-2 can execute the fusion module 108-1 to infer and track objects in the field of view 116 based on sensor data obtained from multiple different sensor interfaces 106 of the automotive system 200. The automotive module 208, when executing at the processor 204-1, can receive an indication of one or more objects (e.g., the other vehicle 112 illustrated in FIG. 1) detected by the fusion module 108-1 in response to the fusion module 108-1 combining and analyzing sensor data obtained from each of the sensor interfaces 106.

Generally, the automotive system 200 executes the automotive module 208 to perform an automotive function using outputs from the sensor-fusion system 104-1. For example, the automotive module 208 can provide automatic cruise control and monitor for objects in or near the field of view 116 to slow vehicle 102 and prevent a read-end collision with the other vehicle 112. In such an example, the fusion module 108-1 can provide sensor data or derivative thereof (e.g., belief parameters and plausibility parameters) as output to the automotive module 208. The automotive module 208 can also provide alerts or cause a specific maneuver when the data obtained from the fusion module 108-1 indicates one or more objects are crossing in front of the vehicle 102.

For ease of simplicity, the track associations data store 110-1 and the belief and plausibility module 210 are described with reference primarily to the vision interface 106-1 and the radar interface 106-2, without reference to another sensor interface 106-n. However, it should be understood that the fusion module 108-1 can combine sensor data or tracks from more than just two different categories of sensors and can rely on sensor data output from other types of sensors besides just vision and radar systems.

The vision interface 106-1 provides a list of vision-based object tracks (also referred to as "vision tracks" in this disclosure). The vision interface 106-1 outputs sensor data, which can be provided in various forms, such as a list of candidate objects being tracked, along with estimates for each of the objects' position, velocity, object class, and reference angles (e.g., an azimuth angle to a centroid reference point on the object, such as a center of a rear face of the other vehicle 112, and other extent angles to near corners of the rear of the other vehicle 112).

Like the vision interface 106-1, the radar interface 106-2 can operate independently from the vision interface 106-1 and the other sensor interfaces 106-n. The radar interface 106-2 can maintain a list of detections and corresponding detection times, which are assumed to mostly be tracking on scattered centers of vehicles and other objects it detects. Each detection typically consists of a range, range rate, and azimuth angle. There is generally more than one detection on each vehicle and object unobstructed in the field of view 116 and at a reasonably close range to the vehicle 102.

The vision interface 106-1 can estimate azimuth angles and object classifications more accurately than other sensor types. However, the vision interface 106-1 may be deficient in estimating some parameters, such as longitudinal position or range, velocity, and the like. The radar interface 106-2 can accurately measure object range and range rate but may be less accurate in measuring the azimuth angle, generally where vision systems are more accurate. The complementing characteristics of vision and radar systems lead to accuracy benefits in matching the vision tracks and the radar tracks.

The fusion module 108-1 maintains a set of associations between the vision tracks and the radar tracks in the track associations data store 110-1. The fusion module 108-1 may determine multiple hypotheses for the set(s) of associations between the radar tracks and the vision tracks (e.g., a first hypothesis that one or more radar tracks match to a particular vision track, a second hypothesis that a specific radar track does not correspond to any vision tracks or a third hypothesis that a specific track of vision does not match to any radar tracks). In other aspects, the set(s) of associations may be based on local track confidence and temporal uncertainties.

The fusion module 108-1 may use Dempster-Shafer fusion to combine the mass value of the multiple hypotheses to generate fused mass values. The belief and plausibility module 210 can use the fused mass values to generate belief and plausibility parameters for the track associations within each set. The belief and plausibility module 210 can also output the belief and plausibility parameters to the automotive module 208.

Figure 3:
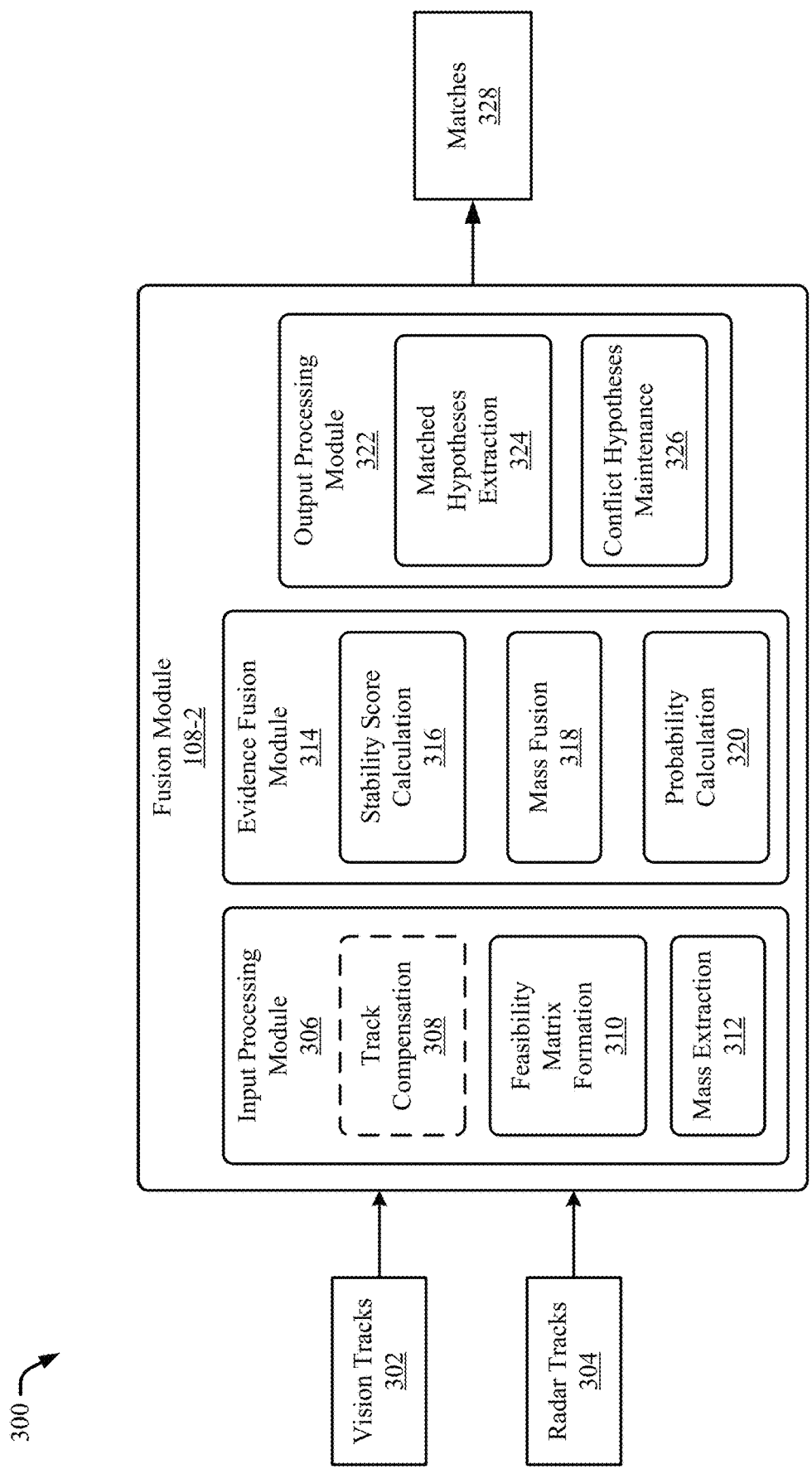
FIG. 3 illustrates an example conceptual diagram illustrating techniques to perform multi-scan sensor fusion for object tracking in accordance with this disclosure.

FIG. 3 illustrates an example conceptual diagram 300 illustrating techniques to perform multi-scan sensor fusion for object tracking in accordance with this disclosure. The conceptual diagram 300 includes the fusion module 108-2, which is an example of the fusion module 108 of FIG. 1 and the fusion module 108-1 of FIG. 2.

Vision tracks 302 and radar tracks 304 are provided as input to the fusion module 108-2. The vision tracks 302 are generated based on vision data. Similarly, the radar tracks 304 are generated based on radar data. The fusion module 108-2 includes an input processing module 306, an evidence fusion module 314, and an output processing module 322. The fusion module 108-2 outputs matches 328, which can be provided to the automotive module 208. In general, the input processing module 306 can preprocess the vision tracks 302 and the radar tracks 304 by performing track compensation 308, assess feasibility pairs of vision tracks 302 and radar tracks 304 by performing feasibility matrix formation 310, and generate mass values for each pair by performing mass extraction 312.

The fusion module 108-2 uses a frame of discernment (FOD) that is defined as a set that describes all possible hypotheses of matching the vision tracks 302 to the radar tracks 304. The elements of a FOD are mutually exclusive and exhaustive. For convenience, the vision tracks 302 and the radar tracks 304 are represented by Equations (1) and (2), respectively:

$$T^V = \{T_{v_1}, T_{v_2}, \ldots, T_{v_M}\} \tag{1}$$

$$T^R = \{T_{r_1}, T_{r_2}, \ldots, T_{r_N}\} \tag{2}$$

where M represents the number of vision tracks 302 and N represents the number of radar tracks 304. The number M of vision tracks 302 can be less than, equal to, or greater than the number N of radar tracks 304.

The input processing module 306 can define a first FOD by considering matching each radar track 304 to the vision tracks 302. The first FOD is defined by Equation (3):

$$\Omega_{r_i \to v} = \{T_{v, g_1}, T_{v, g_2}, \ldots, T_{v, g_m, \gamma}\} \tag{3}$$

where $g_i$ denotes the index of feasible vision tracks 302 after the gating step, $r_i$ is the i-th radar track 304, and $\gamma$ indicates that $r_i$ does not associate with any vision track 302.

The input processing module 306 can also define a second FOD by considering matching each vision track 302 to the radar tracks 304. The second FOD is defined by Equation (4):

$$\Omega_{v_i \to v} = \{T_{r, g_1}, T_{r, g_2}, \ldots, T_{r, g_m, \Xi}\} \tag{4}$$

where $g_i$ denotes the index of feasible radar tracks 304 after the gating step, vi is the i-th vision track 302, and E denotes that $r_i$ does not associate with any radar track 304.

The input processing module 306 assigns a mass value for each element in the FODs based on a different source of information. An individual vision track 302, $T_v$, and an individual radar track 304, $T_r$, can be represented, respectively, by $T_v = \{x_1, x_2, x_3, \ldots, x_n\}$ with covariance matrix $\{P_1, P_2, P_3, \ldots, P_{n_1}\}$ and by $T_r = \{\hat{x}_1, \hat{x}_2, \hat{x}_3, \ldots, \hat{x}_{n_2}\}$ with covariance matrix $\{\hat{P}_1, \hat{P}_2, \hat{P}_3, \ldots, \hat{P}_{n_2}\}$. For convenience, it is assumed that a length of each track is the same (e.g., $n_1 = n_2 = n$).

The mass extraction 312 can be performed based on distance, bounding box size, object class information, or object heading information. The input processing module 306 can calculate the mass value using a distance between two tracks. The distance may be calculated without consideration of covariance using Equation (5):

$$d = \frac{1}{n} \sum_{k=1}^{n} (x_k - \hat{x}_k)^T \cdot (x_k - \hat{x}_k) \tag{5}$$

Alternatively, the distance between two tracks may be calculated with consideration of covariance using Equation (6):

$$d = \frac{1}{n} \sum_{k=1}^{n} (x_k - \hat{x}_k)^T \cdot (P_k + \hat{P}_k)^{-1} \cdot (x_k - \hat{x}_k) \tag{6}$$

The distance between two tracks can also be calculated using the KL divergence as illustrated by Equation (7):

$$d = \frac{1}{n} \sum_{k=1}^{n} \left( KL(N(x_k, P_k), N(\hat{x}_k, \hat{P}_k)) + KL(N(\hat{x}_k, \hat{P}_k), N(x_k, P_k)) \right) \tag{7}$$

Given a set of vision tracks 302 and radar tracks 304, the input processing module 306 can determine the mass values for the first FOD as a function of the distance using Equations (8a) and (8b):

$$m_{geom}(\{\chi\}) = w_d \cdot \frac{\exp(\beta d_\chi)}{\sum_\chi \exp(\beta d_\chi)} \chi \in \Omega_{r_i \to v} \tag{8a}$$

$$m_{geom}(\Omega_{r_i \to v}) = 1 - w_d \tag{8b}$$

The gating threshold can be set for $d \leq \alpha$ and $d_\gamma = \alpha$. For each evidence source, the input processing module 306 can assume the threshold is fixed. For the second FOD, the input processing module 306 can similarly calculate the mass values as a function of the distance.

The input processing module 306 can also calculate the mass value for associations of vision tracks 302 and radar tracks 304 as a function of the likelihood of their association. From the probability perspective, the probability density function of $T_v$ can be represented by Equation (9):

$$p(T_v) = \frac{1}{n}\sum_{k=0}^{n} N(x_k, P_k) \quad (9)$$

The similarity is then described by the negative log-likelihood (NLL) in Equation (10):

$$S_d = \text{NLL}(\hat{x}_k) \quad (10)$$

Given a set of vision tracks 302 and radar tracks 304, the input processing module 306 can determine the mass values for the first FOD as a function of the similarity using Equations (11a) and (11b):

$$m_{geom}(\{\chi\}) = w_l \cdot \frac{\exp(\beta s_{d_\chi})}{\sum_\chi \exp(\beta s_{d_\chi})} \chi \in \Omega_{r_i \to v} \quad (11a)$$

$$m_{geom}(\Omega_{r_i \to v}) = 1 - w_l \quad (11b)$$

For the second FOD, the input processing module 306 can similarly calculate the mass values as a function of the similarity with $\chi \in \Omega_{r_i \to r}$.

The input processing module 306 can also calculate the mass value for associations of vision tracks 302 and radar tracks 304 as a function of bounding box size information. The bounding box information can be used based on the assumption that an object size is the same in each of its tracks and the matching of those tracks is perfect. Based on these assumptions, the input processing module 306 can use the area of the bounding box to calculate mass values. For convenience, the area of the vision track 302 is given by $A_v = \{a_1, a_2, a_3, \ldots a_{n_1}\}$. Similarly, the area of the radar track 304 is given by $A_r = \{\hat{a}_1, \hat{a}_2, \hat{a}_3, \ldots \hat{a}_{n_2}\}$. The distance of the area information between two tracks is given by Equation (12):

$$d_a = \frac{1}{n}\sum_{k=1}^{n}(a_k - \hat{a}_k)^2 \quad (12)$$

Rather than using the area, the input processing module 306 can similarly use the length and width directly, as shown in Equation (13):

$$d_{lh} = \frac{1}{n}\sum_{k=1}^{n}(lh_k - \hat{lh}_k)^T \cdot (lh_k - \hat{lh}_k) \quad (13)$$

where $lh_k$ denotes the length and height information.

Given a set of vision tracks 302 and radar tracks 304, the input processing module 306 can determine the mass values for the first FOD as a function of the distance of the area from Equations (12) or (13) using Equations (14a) and (14b):

$$m_{bbox}(\{\chi\}) = w_b \cdot \frac{\exp(\beta d_{lh_\chi})}{\sum_\chi \exp(\beta d_{lh_\chi})} \chi \in \Omega_{r_i \to v} \quad (14a)$$

$$m_{bbox}(\Omega_{r_i \to v}) = 1 - w_b \quad (14b)$$

For the second FOD, the input processing module 306 can similarly calculate the mass values as a function of the bounding box size information with $\chi \in \Omega_{r_i \to r}$.

The input processing module 306 can also calculate the mass value for associations of vision tracks 302 and radar tracks 304 as a function of object class information. The object class can be defined as $C = \{c_1, c_2, \ldots, c_m\}$. Accordingly, the class of the vision track 302 is given by $C_v = \{C_1, C_2, C_3, \ldots C_{n_1}\}$. Similarly, the class of the radar track 304 is given by $C_r = \{\hat{C}_1, \hat{C}_2, \hat{C}_3, \ldots \hat{C}_{n_1}\}$. The distance of the class information between two tracks is given by Equation (15):

$$d_c = \frac{1}{n}\sum_{k=1}^{n} H(C_k, \hat{C}_k) \quad (15)$$

where $H(C_k, \hat{C}_k)$ is the cross-entropy that is described by Equation (16):

$$H(C_k, \hat{C}_k) = -\Sigma_{c_i} C(c_i) \log(\hat{C}(c_i)) \quad (16)$$

Given a set of vision tracks 302 and radar tracks 304, the input processing module 306 can determine the mass values for the first FOD as a function of the distance of the object class information using Equations (17a) and (17b):

$$m_{oc}(\{\chi\}) = w_c \cdot \frac{\exp(\beta H_\chi)}{\sum_\chi \exp(\beta H_\chi)} \chi \in \Omega_{r_i \to v} \quad (17a)$$

$$m_{oc}(\Omega_{r_i \to v}) = 1 - w_c \quad (17b)$$

For the second FOD, the input processing module 306 can similarly calculate the mass values as a function of the object class information with $\chi \in \Omega_{r_i \to r}$.

The input processing module 306 can also calculate the mass value for associations of vision tracks 302 and radar tracks 304 as a function of object heading information.

The input processing module 306 can also calculate the mass value for associations of vision tracks 302 and radar tracks 304 as a function of object class information. The input processing module 306 considers the latest object heading information because this information is partially captured by the position information. The heading of the vision track 302 is given by $h_v$. Similarly, the heading of the radar track 304 is given by $h_r$. The distance of the heading information between two tracks is given by Equation (18):

$$d_h = |1 - \cos(|h_v - h_r|)| \quad (18)$$

Given a set of vision tracks 302 and radar tracks 304, the input processing module 306 can determine the mass values for the first FOD as a function of the distance of the heading information using Equations (19a) and (19b):

$$m_{oc}(\{\chi\}) = w_h \cdot \frac{\exp(\beta d_{h_\chi})}{\sum_\chi \exp(\beta d_{h_\chi})} \chi \in \Omega_{r_i \to v} \quad (19a)$$

$$m_{oc}(\Omega_{r_i \to v}) = 1 - w_h \quad (19b)$$

For the second FOD, the input processing module 306 can similarly calculate the mass values as a function of the object class information with $\chi \in \Omega_{r_i \to r}$. The input processing module 306 can similarly use velocity information to extract mass values.

The evidence fusion module 314 can determine a belief parameter and a plausibility parameter for each pair by performing stability score calculations 316, generate fused mass values via Dempster-Shafer fusion by performing mass fusion 318, and determine a probability parameter by performing probability calculation 320.

The evidence fusion module 314 can use Dempster-Shafer fusion to fuse the mass values of multiple hypotheses. First, based on the mass values for different sources, the evidence fusion module 314 uses the Dempster-Shafer theory to obtain the fused mass value for a specific hypothesis. Two information sources can be fused to determine the joint mass value $m_{1,2}(\cdot)$ using Equations (20) through (22):

$$m_{1,2}(\emptyset)=0 \tag{20}$$

$$m_{1,2}(H) = m_1(H) \oplus m_2(H) = \frac{1}{1-K} \sum_{B \cap C = H \neq \emptyset} m_1(B) m_2(C) \tag{21}$$

where $$K = \sum_{B \cap C = \emptyset} m_1(B) m_2(C) \tag{22}$$

The expression (1−K) is the normalization coefficient, in which K denotes the conflict between the evidence, $m_1(\cdot)$ and $m_2(\cdot)$ represent the mass value corresponding to a specific hypothesis for the first evidence and the second evidence, respectively, and B and C are the hypotheses determined by the FOD. The evidence fusion module 314 may include a calculation of mass values for each element in a given frame of discernment based on a different source of information (e.g., distance, similarity, track heading information, bounding box information, object class information, or object heading information).

Second, based on the fused mass value, evidence fusion module 314 calculates the belief parameter and plausibility parameter. The belief bel(H) and plausibility pl(H) of a specific hypothesis H are given by Equations (23) and (24):

$$bel(H) = \sum_{B|B \in H} m(B) \tag{23}$$

$$pl(H) = \sum_{B|B \cap H \neq \emptyset} m(B) \tag{24}$$

At initialization, the evidence fusion module 314 does not have a mass value available and only uses information from measurements.

The output processing module 322 can identify hypotheses without conflict by performing matched hypotheses extraction 324 and determine hypotheses with conflicts by performing conflict hypotheses maintenance 326. The output processing module 322 outputs the matches 328 with improved accuracy as a result of the described processing techniques.

The output processing module 322 can extract associations using a probability matrix for the first FOD (described in greater detail with respect to FIG. 5) or the second FOD. In particular, the output processing module 322 can extract associations that exceed a pre-defined decision threshold (e.g., 0.5) for probability for the first FOD. If no associations exceed the decision threshold, the output processing module 322 can extract associations with ambiguity that exceed a pre-defined significant threshold (e.g., 0.3). The same extractions are then performed for the second FOD. The extracted associations or hypotheses without a conflict between the first and second FOD and exceed the decision threshold are maintained in a data store. If a conflict between the association exists between the probability matrices or associations that exceed the significant threshold, these hypotheses are maintained in a conflict data store. Hypotheses in the conflict data store are not output as the track associations, but the output processing module 322 maintains these hypotheses for the next scan. In the next scan, the output processing module 322 prunes a conflict hypothesis if the probability is lower than the significant threshold or accepts the conflict hypothesis if the probability is higher than the decision threshold. The output processing module 322 maintains the conflict hypothesis for tracking if it passes the significant threshold but does not pass the decision threshold.

Figure 4:
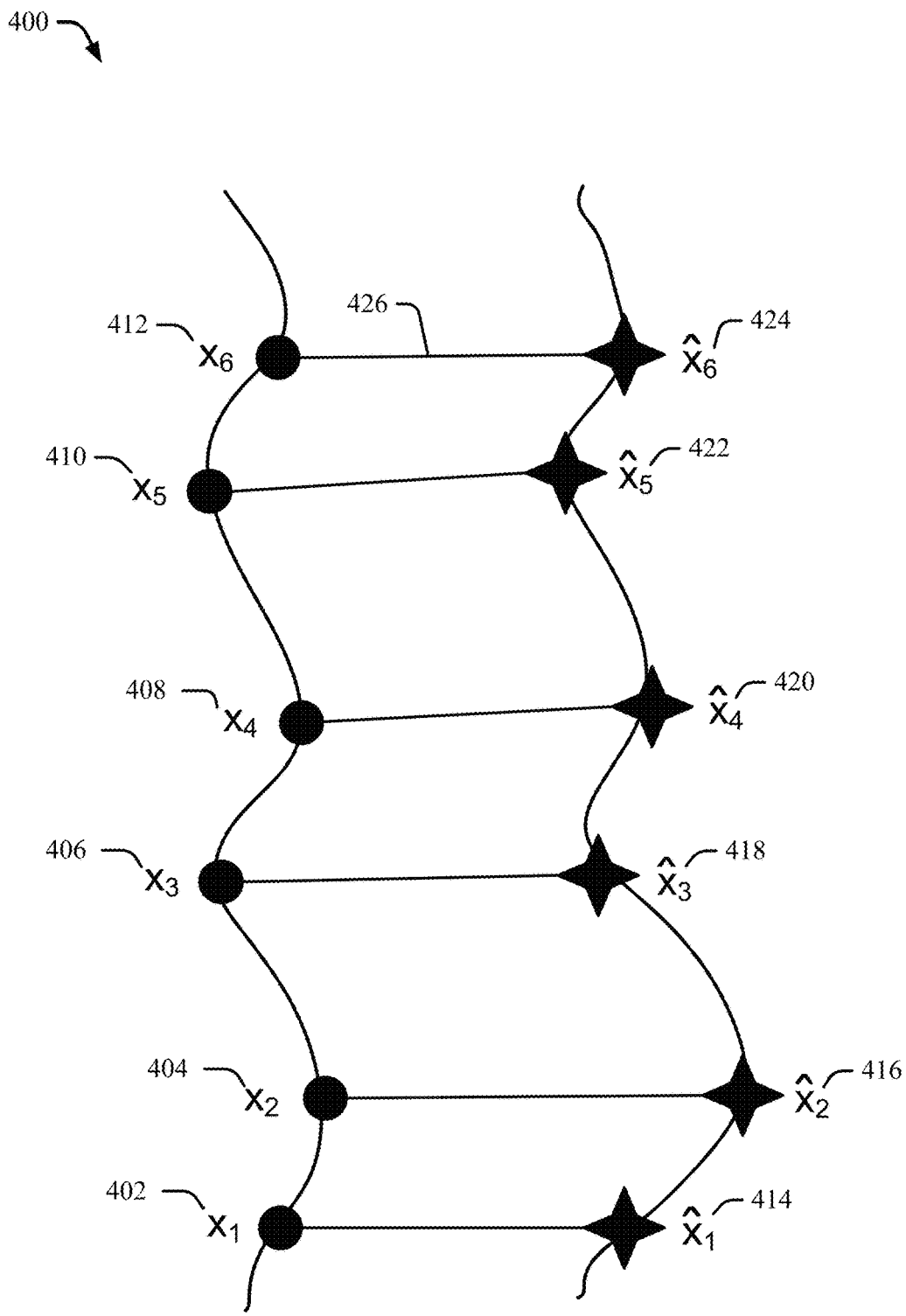
FIG. 4 illustrates an example diagram to calculate distances in generating mass values for multi-scan sensor fusion in accordance with this disclosure.

FIG. 4 illustrates an example diagram 400 to calculate distances in generating mass values for multi-scan sensor fusion in accordance with this disclosure. The diagram 400 includes a vision track 302 defined by points $x_1$, $x_2$, $x_3$, $x_4$, $x_5$, $x_6$ (points 402, 404, 406, 408, 410, and 412, respectively) and a radar track 304 defined by $\hat{x}1$, $\hat{x}2$, $\hat{x}3$, $\hat{x}_4$, $\hat{x}_5$, $\hat{x}_6$ (points 414, 416, 418, 420, 422, and 424, respectively). The input processing module 306 can calculate the distance between a point on the vision track 302 and a point on the radar track 304 (e.g., the distance between point 402 and point 414). For example, a distance 426 may be calculated between $x_6$ and $\hat{x}_6$. In the example diagram 400, the input processing module 306 assumes the radar track length is the same as the vision track length. Without consideration of covariance, the distance calculation can be defined by Equation (5):

$$d = \frac{1}{n} \sum_{k=1}^{n} (x_k - \hat{x}_k)^T \cdot (x_k - \hat{x}_k) \tag{5}$$

Alternatively, with consideration of a covariance matrix defined by $P_1, P_2, P_3, \ldots, P_{n_1}$, the distance calculation may be defined by Equation (6):

$$d = \frac{1}{n} \sum_{k=1}^{n} (x_k - \hat{x}_k)^T \cdot (P_k + \hat{P}_k)^{-1} \cdot (x_k - \hat{x}_k) \tag{6}$$

Figure 5:
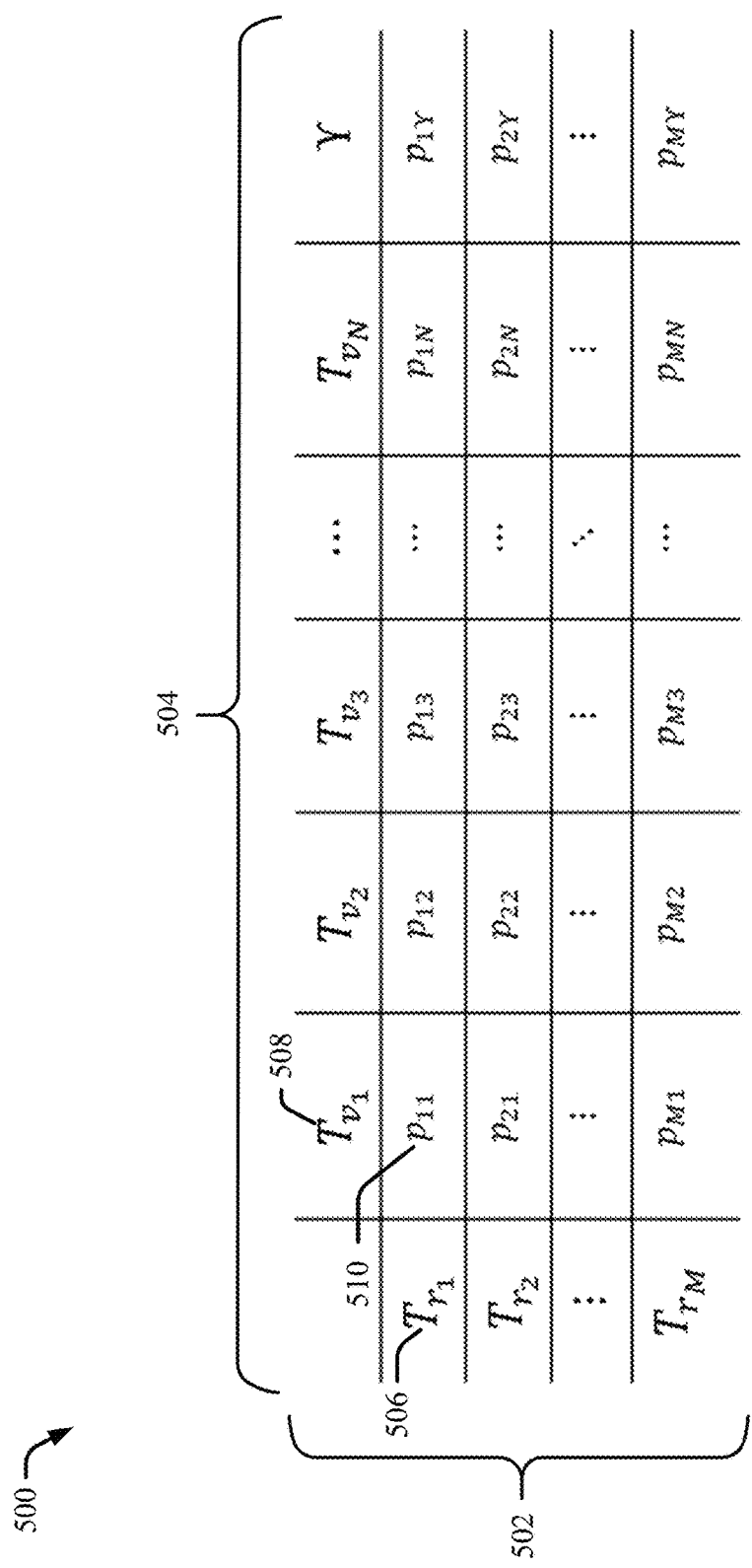
FIG. 5 illustrates an example probability matrix for hypotheses of associating vision tracks and radar tracks.

FIG. 5 illustrates an example probability matrix 500 for hypotheses of associating vision tracks 302 and radar tracks 304. The probability matrix 500 is formed for the first FOD (e.g., $\Omega_{r_i \to v_i}$). As described above, a FOD is defined as a set that describes all possible hypotheses of associating the radar tracks 304 to the vision tracks 302, or vice versa. The probability matrix 500 indicates the probability of each possible pair of track associations in the first FOD. In particular, the probability matrix 500 considers a set of radar tracks 502 and a set of vision tracks 504. In the probability matrix 500, each element $p_{ij}$ is the probability to associate $T_{r_i}$ with $T_{v_j}$ based on the mass function corresponding to the first FOD. For example, the probability to associate the first radar track 506 ($T_{r_1}$) with the first vision track 508 ($T_{v_1}$) is the probability 510 ($p_{11}$).

A similar probability matrix can be formed for the second FOD (e.g., $\Omega_{r_i \to r_i}$). In that probability matrix, each element $\tilde{p}_{ij}$ is the probability to associate $T_{v_j}$ with $T_{r_i}$ based on the mass function corresponding to the second FOD. In the second FOD, the probability matrix can also consider the possibility that a single vision track matches to multiple radar tracks. The probabilities can be determined using the pignistic transformation. After gating or clustering, many elements in the probability matrices are zero and fewer possible associations need to be considered.

Figure 6:
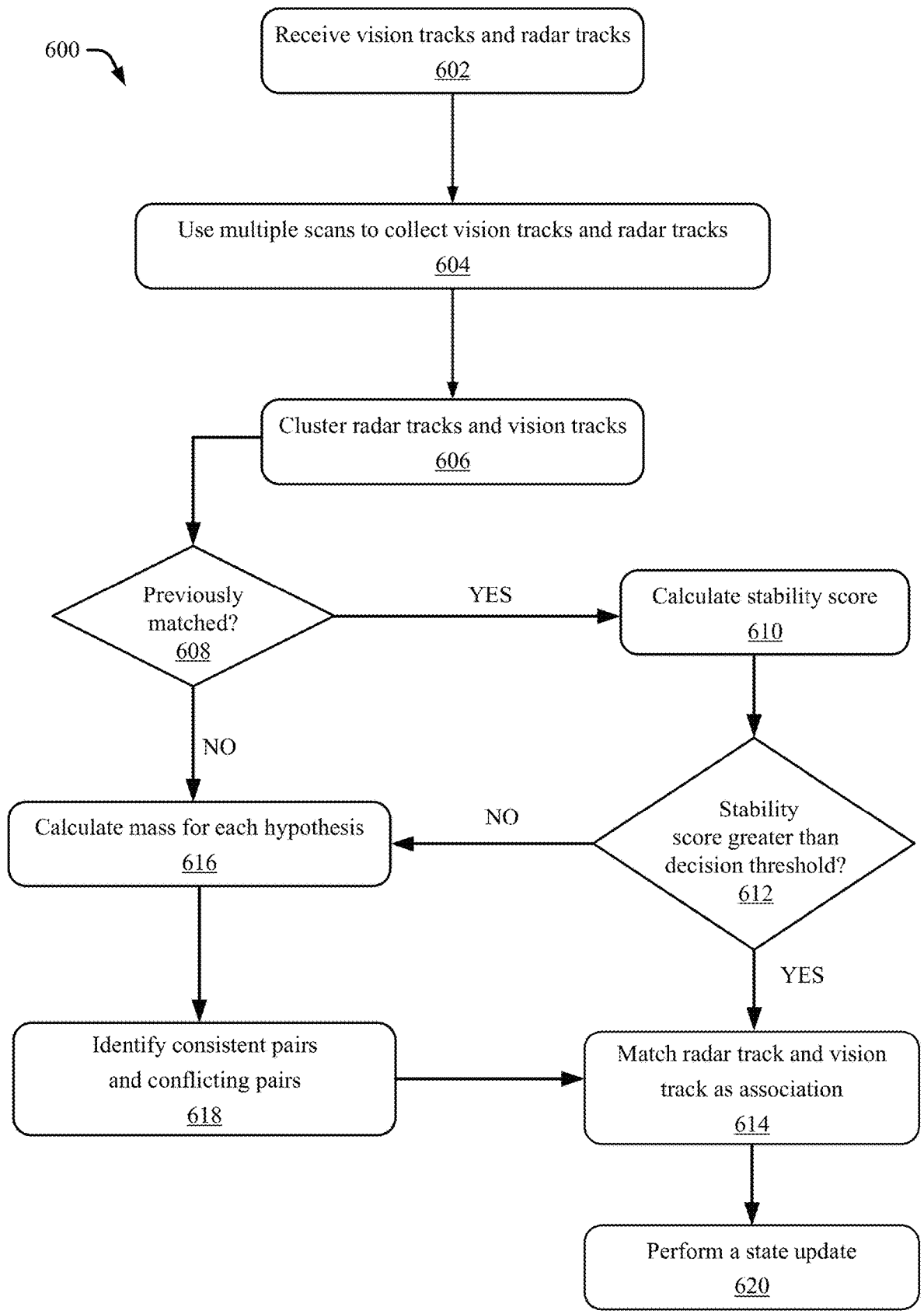
FIG. 6 illustrates an example flowchart of multi-scan sensor fusion for object tracking in accordance with this disclosure.

FIG. 6 illustrates an example flowchart 600 of multi-scan sensor fusion for object tracking in accordance with this disclosure. The operations of the flowchart 600 can be performed by the fusion module 108, 108-1, or 108-2 of FIGS. 1-3 or a similar fusion module. The flowchart 600 can also include fewer or additional operations than those described with reference to FIG. 6

At 602, the fusion module 108 receives or obtains vision tracks and radar tracks. For example, the fusion module 108 can receive the vision tracks and the radar tracks via the vision interface 106-1 and the radar interface 106-2, respectively. In other implementations, the fusion module 108 can receive vision data and radar data via the vision interface 106-1 and the radar interface 106-2, respectively.

At 604, the fusion module 108 uses multiple scans to initialize the track matching and then uses a sliding window to continue processing matches. The use of multiple scans is described in greater detail with respect to FIG. 7.

At 606, the fusion module 108 can perform clustering to reduce the number of tracks to process and consider. The clustering can be based on the geometric distance or probability density. It is assumed that the tracks are aligned well in terms of time and the Euclidean distance is used as the metric to cluster tracks. If the time is not well aligned for different tracks, the dynamic time warping distance metric (DTW) can be used.

At 608, the fusion module 108 determines whether each radar track and each vision track has previously been matched or associated with another track. If the track has been previously matched, then the fusion module 108 calculates a stability score at 610 for the match or association. At 612, the fusion module 108 determines whether the stability score is greater than the decision threshold. If the stability score is greater than the decision threshold, then the association of the radar track and vision track is output as a match at 614. The fusion module 108 can skip the matching process if the matched radar track and vision track are maintained with good confidence it was verified in the previous iteration of the flowchart 600. The fusion module 108 uses the stability score to consider the temporal uncertainty of the current window and the uncertainty of how well the track was maintained by each tracker. The stability score is defined using Equation (25):

$$SS = e^{-\alpha \Delta t} \cdot S_{v,\Delta t} \cdot S_{r,\Delta t} \qquad (25)$$

where $\Delta t$ is the distance of time between current scan and the last scan in which the match was verified. $S_{v,\Delta t}$ is defined using Equations (26) and (27):

$$S_{v,\Delta t} = \Pi_{i \in (t, t+\Delta t)} p_i^v \qquad (26)$$

where $$p_i^v = \begin{cases} P(z_i^v | x_i) P_d & z_i^v \neq \emptyset \\ (1 - p_d) & z_i^v = \emptyset \end{cases} \qquad (27)$$

$p_d$ is the detection probability and $p(z_i^v | x_i)$ is the likelihood for the tracker. Similarly, $S_{r,\Delta t}$ is defined using Equations (28) and (29):

$$S_{v,\Delta t} = \Pi_{i \in (t, t+\Delta t)} p_i^r \qquad (28)$$

where $$p_i^r = \begin{cases} p(z_i^r | x_i) p_d & z_i^r \neq \emptyset \\ (1 - p_d) & z_i^r = \emptyset \end{cases} \qquad (29)$$

The fusion module 108 uses a threshold R to determine whether the matching operation can be skipped in a particular iteration of the flowchart 600. The fusion module 108 can also define a break threshold $N_{break}$ as the number of unavailable scans from a specific track. When the number of unavailable scans is number is greater or equal to the break threshold, the matching breaks up. A sliding window is used again for that pair of track associations.

At 616, if the track has not been previously matched or if the stability score is less than the decision threshold, then the fusion module 108 calculates a mass value for each potential hypothesis to associate the unmatched track with other tracks using all available measurements. The hypotheses can include one or more radar tracks match to a particular vision track, a radar track does not match to a vision track, or a vision track does not match to a radar track. At 618, after calculating the mass value for each hypothesis, the fusion module 108 identifies consistent pairs and conflicting pairs as described with respect to FIG. 5. At 620, a state update of the matched pairs is provided to the automotive module 208.

Figures 1, 7:
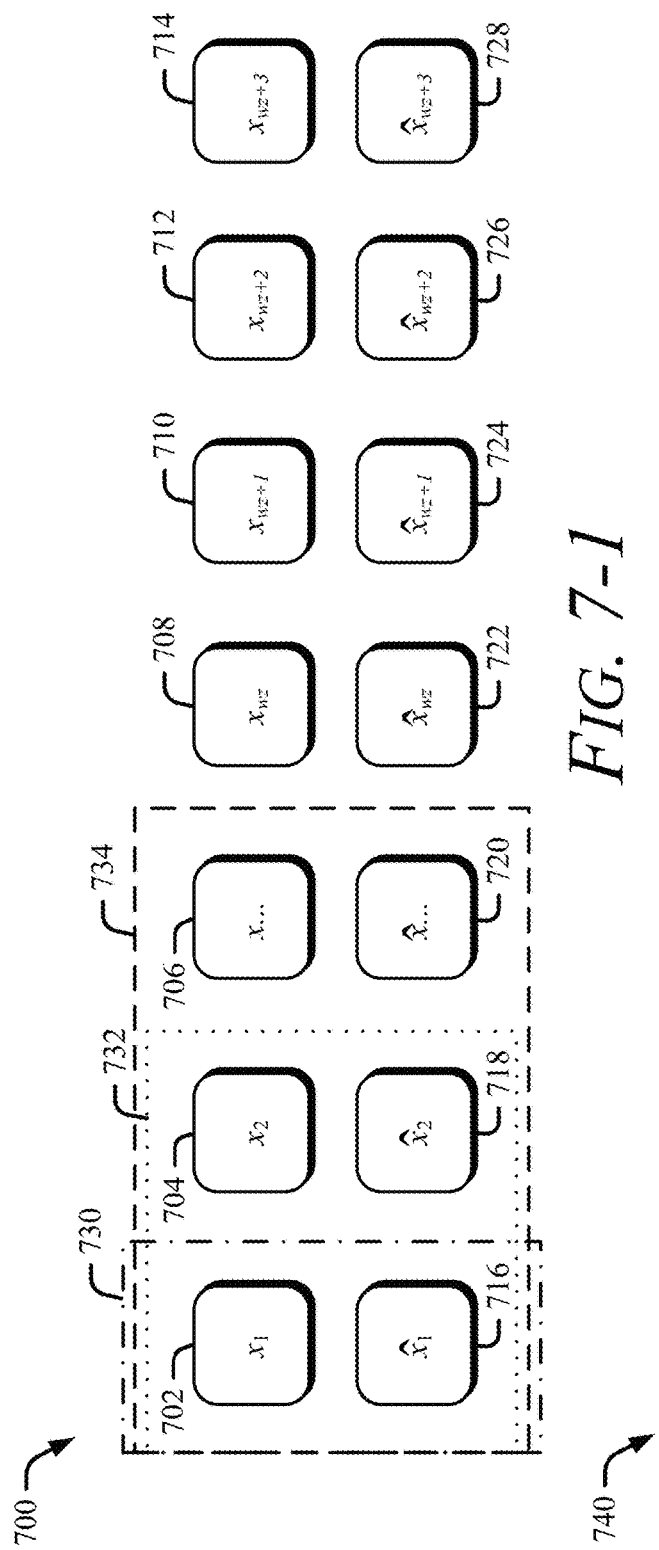
Figures 2, 7:
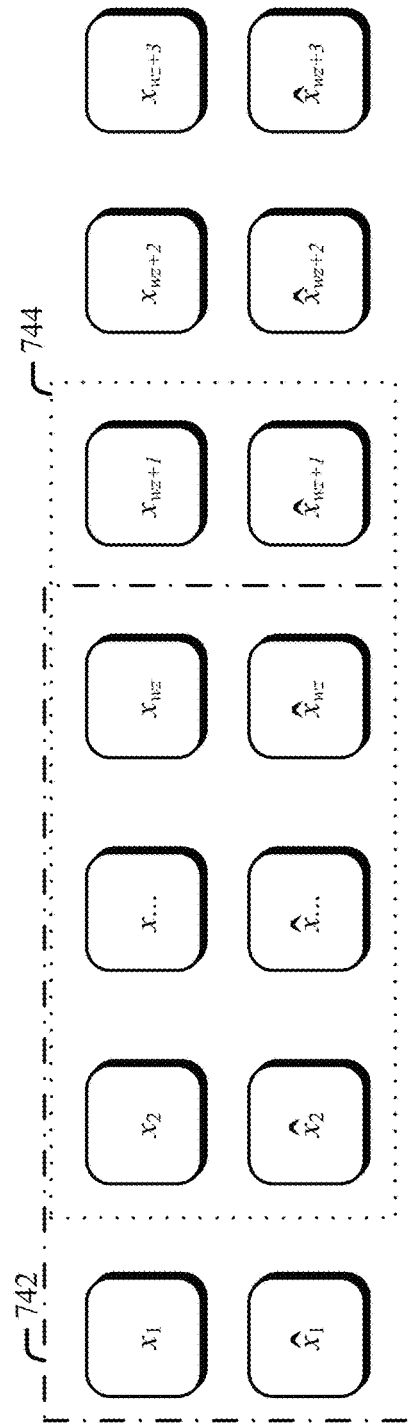

FIGS. 7-1 and 7-2 illustrate the use of multiple-scan windows to perform multi-scan sensor fusion for object tracking in accordance with this disclosure. FIG. 7-1 illustrates an example diagram 700 to initialize multiple-scan windows. A window (e.g., windows 730, 732, and 734) may be used for maintaining multiple scan information rather than a single scan by "sliding" the window based on certain criteria. The window may also be used for input selection to the matching algorithm detailed in FIGS. 3 through 6. For example, consider individual vision track information $x_1, x_2, x, \ldots, x_{wz}, x_{wz+1}, x_{wz+2}$ (vision track data 702, 704, 706, 708, 710, 712, and 714, respectively) and radar track information $\hat{x}_1, \hat{x}_2, \hat{x} \ldots, \hat{x}_{wz}, \hat{x}_{wz+1}, \hat{x}_{wz+2}$ (radar track data 716, 718, 720, 722, 724, 726, and 728, respectively). Individual tracks may be assigned to a window and processed accordingly. For example, a first window 730, a second window 732, and a third window 734 are processed sequentially. Because the length of each vision track and radar track is less than the size of an individual window or scan, the track information is accumulated in the sliding windows. The currently available information for each track (e.g., within a particular window) is used to calculate the similarity between different vision tracks and radar tracks.

FIG. 7-2 illustrates an example diagram 740 that demonstrates the use of a sliding window to perform multi-scan sensor fusion for object tracking. A first window 742 at time k includes track information from multiple scans (e.g., vision track data 702, 704, 706, and 708 and radar track data 716, 718, 720, and 722). A second window 744 at time k+1 includes track information from multiple scans (e.g., vision track data 704, 706, 708, and 710 and radar track data 718, 720, 722, and 724). The first window 742 and the second window 744 represent distinct windows. The track information used at time k+1 may be obtained by "sliding" the window forward a single step or scan from time k. Sliding windows allow the fusion module 108 to maintain a history of track data and hypotheses that can then be used to minimize the number of potential matches or reduce the matching complexity.

Example Method

Figure 8:
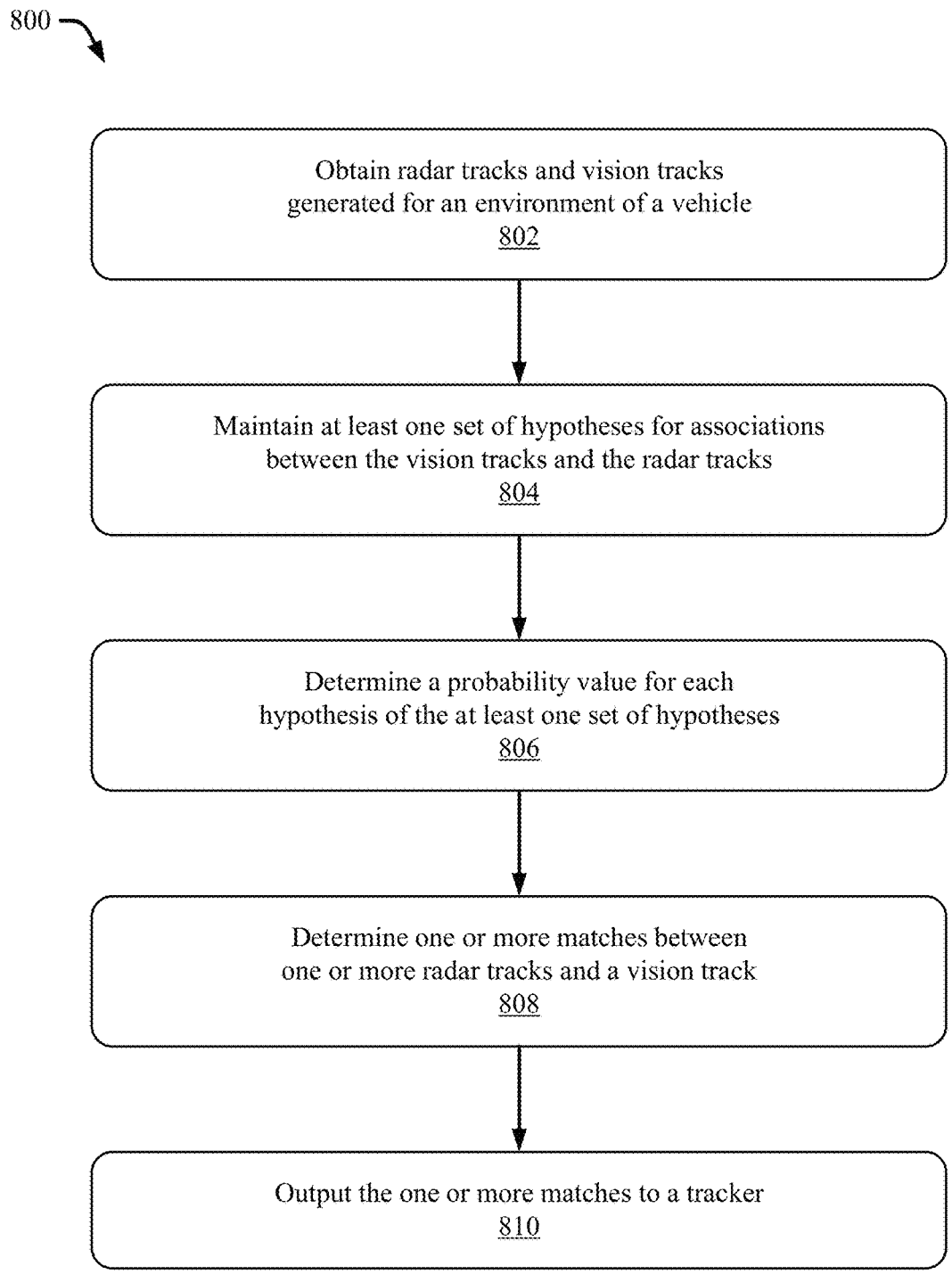
FIG. 8 illustrates an example flowchart of a method to perform multi-scan sensor fusion for object tracking in accordance with this disclosure.

FIG. 8 illustrates an example flowchart 800 of a method to perform multi-scan sensor fusion for object tracking in accordance with this disclosure. The example flowchart 800 is shown as a set of operations 802 through 810, which are performed in, but not limited to, the order or combinations in which the operations are shown or described. Further, any of the operations 802 through 810 may be repeated, combined, or reorganized to provide other methods. In portions of the following discussion, reference may be made to the environment 100 and entities detailed above, reference to which is made for example only. The techniques are not limited to performance by one entity or multiple entities.

At 802, a sensor-fusion system of a vehicle obtains radar tracks and vision tracks generated for an environment of a vehicle. For example, the sensor-fusion system 104 of the vehicle 102 can obtain the vision tracks 302 and the radar tracks 304 that are generated for the environment 100. The vision tracks 302 are generated based on vision data from one or more vision sensors on the vehicle 102. The radar tracks 304 are generated based on radar data from one or more radar sensors on the vehicle 102. The radar sensors have a field of view that at least partially overlaps with a field of view of the vision sensors.

At 804, the sensor-fusion system maintains at least one set of hypotheses for associations between the vision tracks and the radar tracks based on multiple scans of the radar data and the vision data. For example, the sensor-fusion system 104 can maintain multiple sets of hypotheses for associations between the vision tracks 302 and the radar tracks 304 based on multiple scans of the radar data and the vision data. The hypotheses include at least one of one or more radar tracks matching a vision track, a vision track matching one or more radar tracks, a radar track not matching a vision track, or a vision track not matching a radar track. In particular, the hypotheses can include a first set of hypotheses (FOD) and a second set of hypotheses (FOD). The first set of hypotheses can include at least one of one or more radar tracks matching a vision track and a radar track not matching a vision track. The second set of hypotheses can include at least one of a vision track matching one or more radar tracks and a vision track not matching a radar track.

The sensor-fusion system 104 uses a window of multiple scans of the radar tracks and the vision tracks that includes the radar data and the vision data from a current sensor scan and at least one previous sensor scan. The window steps forward by a single step in each iteration of operation 804. The window initializes with a single scan of the radar tracks and the vision tracks and accumulates additional scans of the radar tracks and the vision tracks in each iteration of the operation 804 until the window reaches a predetermined window size.

The sensor-fusion system 104 can also determine mass values for the associations between the vision tracks 302 and the radar tracks 304. The mass values can be assigned based on distances between tracks, similarities between tracks, heading information, bounding box information, object class information, velocity information, or object heading information. In some implementations, the mass values can be assigned based on at least three of distances between tracks, similarities between tracks, heading information, bounding box information, object class information, velocity information, or object heading information. The sensor-fusion system 104 can determine based on the mass values a belief parameter and a plausibility parameter for each hypothesis. The mass values can be combined using a Dempster-Shafer fusion process to generate a fused mass value. The belief parameter and the plausibility parameter can be determined based on the fused mass values.

At 806, the sensor-fusion system determines a probability value for each hypothesis of the at least one set of hypotheses based on mass values. For example, the sensor-fusion system 104 can determine a probability matrix for each hypothesis of the sets of hypotheses based on the mass values. The probability value indicates a likelihood that a particular hypothesis is accurate.

At 808, the sensor-fusion system determines one or more matches between one or more radar tracks and a vision track based on the probability value for each hypothesis. For example, the sensor-fusion system 104 can determine matches between one or more radar tracks and a vision track based on the probability value for the hypotheses. The matches include one or more hypotheses with probability values that exceed a decision threshold. The sensor-fusion system 104 can also extract one or more first hypotheses from the first set of hypotheses and one or more second hypotheses from the second set of hypotheses that have probability values that exceed the decision threshold. The sensor-fusion system 104 can then identify the matches as those hypotheses among the first hypotheses and the second hypotheses that exceed the decision threshold.

The sensor-fusion system 104 can extract one or more third hypotheses from the first set of hypotheses and one or more fourth hypotheses from the second set of hypotheses with probability values that exceed a significant threshold responsive to no hypothesis among the first set of hypotheses or the second set of hypotheses exceeding the decision threshold. The significant threshold has a lower value (e.g., 0.3) than the decision threshold (e.g., 0.5). The sensor-fusion system 104 can maintain conflict hypotheses among the first hypotheses and the second hypotheses that do not both exceed the decision threshold and hypotheses that exceed the significant threshold. The sensor-fusion system 104 can skip verifying the matches in a subsequent iteration of the operation 808 if a stability score of the matches is above a threshold value. The stability score indicates a local track confidence and a temporal uncertainty associated with each match. The sensor-fusion system 104 can also maintain the one or more third hypotheses and the one or more fourth hypotheses.

At 810, the sensor-fusion system outputs the one or more matches to a semi-autonomous or autonomous driving system of the vehicle to a tracker. The output of the tracker is then used to control operation of the vehicle. For example, the sensor-fusion system 104 can output the matches to a tracker. The output of the tracker can be provided to the automotive module 208 to control operation of the vehicle 102. The sensor-fusion system 104 can also outputting the belief parameter and the plausibility parameter for the matches to further update the matches and control operation of the vehicle 102 based on the belief parameter and the plausibility parameter.

Additional Examples

In the following section, additional examples of multi-scan sensor fusion for object tracking are provided.

Example 1. A method comprising: obtaining radar tracks and vision tracks generated for an environment of a vehicle, the radar tracks being generated based on radar data from one or more radar sensors on the vehicle and the vision tracks being generated based on vision data from one or more vision sensors on the vehicle, the one or more radar sensors having a first field of view that at least partially overlaps with a second field of view of the one or more vision sensors; maintaining, based on multiple scans of the radar data and the vision data, at least one set of hypotheses for associations between the vision tracks and the radar tracks, the at least one set of hypotheses including mass values for the associations between the vision tracks and the radar tracks; determining, based on the mass values, a probability value for each hypothesis of the at least one set of hypotheses, the probability value indicating a likelihood that each hypothesis is accurate; determining, based on the probability value for each hypothesis, one or more matches between one or more radar tracks and a vision track, the one or more matches comprising one or more hypotheses with probability values that exceed a decision threshold; and outputting, to a semi-autonomous or autonomous driving system of the vehicle, the one or more matches to control operation of the vehicle.

Example 2. The method of example 1, the method further comprising: assigning the mass values to the associations between the vision tracks and the radar tracks based on at least one of distances between tracks, similarities between tracks, heading information, bounding box information, object class information, velocity information, or object heading information.

Example 3. The method of example 2, wherein the mass values are assigned to the associations between the vision tracks and the radar tracks based on at least three of distances between tracks, similarities between tracks, heading information, bounding box information, object class information, velocity information, or object heading information.

Example 4. The method of any one of the preceding examples, wherein the at least one set of hypotheses comprises at least one of one or more radar tracks matching a vision track, a vision track matching one or more radar tracks, a radar track not matching a vision track, or a vision track not matching a radar track.

Example 5. The method of any one of the preceding examples, wherein the at least one set of hypotheses comprises a first set of hypotheses and a second set of hypotheses, the first set of hypotheses including at least one of one or more radar tracks matching a vision track and a radar track not matching a vision track, the second set of hypotheses including at least one of a vision track matching one or more radar tracks and a vision track not matching a radar track.

Example 6. The method of example 5, wherein determining one or more matches between one or more radar tracks and a vision track comprises: extracting, from the first set of hypotheses, one or more first hypotheses with the probability value that exceed the decision threshold; extracting, from the second set of hypotheses, one or more second hypotheses with the probability value that exceed the decision threshold; and identifying the one or more matches as hypotheses among the one or more first hypotheses and the one or more second hypotheses that both exceed the decision threshold.

Example 7. The method of example 6, the method further comprising: responsive to no hypothesis among the first set of hypotheses exceeding the decision threshold, extracting one or more third hypotheses with the probability values that exceed a significant threshold, the significant threshold having a lower value than the decision threshold; responsive to no hypothesis among the second set of hypotheses exceeding the decision threshold, extracting one or more fourth hypotheses with the probability values that exceed the significant threshold; maintaining conflict hypotheses among the one or more first hypotheses and the one or more second hypotheses that do not both exceed the decision threshold; and maintaining the one or more third hypotheses and the one or more fourth hypotheses.

Example 8. The method of any one of the preceding examples, wherein the one or more matches are not verified in a subsequent iteration if a stability score of the one or more matches is above a threshold value, the stability score indicating a local track confidence and a temporal uncertainty associated with each match of the one or more matches.

Example 9. The method of any one of the preceding examples, wherein a window of the multiple scans of the radar tracks and the vision tracks includes the radar data and the vision data from a current sensor scan and at least one previous sensor scan.

Example 10. The method of example 9, wherein the window of the multiple scans steps forward by a single step in each iteration of maintaining at least one set of hypotheses for associations between the vision tracks and the radar tracks.

Example 11. The method of example 9, wherein the window of the multiple scans initializes with a single scan of the radar tracks and the vision tracks and accumulates additional scans of the radar tracks and the vision tracks in each iteration of maintaining at least one set of hypotheses for associations between the vision tracks and the radar tracks until the window of multiple scans reaches a predetermined window size.

Example 12. The method of any one of the preceding examples, the method further comprising: determining, based on the mass values for the associations between the vision tracks and the radar tracks, a belief parameter and a plausibility parameter for each hypothesis of the at least one set of hypotheses; and outputting, to the semi-autonomous or autonomous driving system of the vehicle, the belief parameter and the plausibility parameter for the one or more matches with the one or more matches to further update the one or more matches and control operation of the vehicle based on the belief parameter and the plausibility parameter for the one or more matches.

Example 13. The method of example 12, the method further comprising combining the mass values for the associations between the vision tracks and the radar tracks to generate a fused mass value for each association of the at least one set of hypotheses, the belief parameter and the plausibility parameter being determined based on the fused mass value.

Example 14. The method of example 13, wherein a Dempster-Shafer fusion process is used to combine the mass values for the associations between the vision tracks and the radar tracks.

Example 15. A system comprising a processor configured to: obtain radar tracks and vision tracks generated for an environment of a vehicle, the radar tracks being generated based on radar data from one or more radar sensors on the vehicle and the vision tracks being generated based on vision data from one or more vision sensors on the vehicle, the one or more radar sensors having a first field of view that at least partially overlaps with a second field of view of the one or more vision sensors; maintain, based on multiple scans of the radar tracks and the vision tracks, at least one set of hypotheses for associations between the vision tracks and the radar tracks, the at least one set of hypotheses including mass values for the associations between the vision tracks and the radar tracks; determine, based on the mass values, a probability value for each hypothesis of the at least one set of hypotheses, the probability value indicating a likelihood that each hypothesis is accurate; determine, based on the probability value for each hypothesis, one or more matches between one or more radar tracks and a vision track, the one or more matches comprising one or more hypotheses with probability values that exceed a decision threshold; and output, to a semi-autonomous or autonomous driving system of the vehicle, the one or more matches to control operation of the vehicle.

Example 16. The system of example 15, wherein the processor is further configured to assign the mass values to the associations between the vision tracks and the radar tracks based on at least one of distances between tracks, similarities between tracks, heading information, bounding box information, object class information, velocity information, or object heading information.

Example 17. The system of example 15 or 16, wherein the at least one set of hypotheses comprises a first set of hypotheses and a second set of hypotheses, the first set of hypotheses including at least one of one or more radar tracks matching a vision track and a radar track not matching a vision track, the second set of hypotheses including at least one of a vision track matching one or more radar tracks and a vision track not matching a radar track.

Example 18. The system of example 17, wherein the processor is configured to determine the one or more matches between one or more radar tracks and a vision track by: extracting, from the first set of hypotheses, one or more first hypotheses with the probability value that exceed the decision threshold; extracting, from the second set of hypotheses, one or more second hypotheses with the probability value that exceed the decision threshold; and identifying the one or more matches as hypotheses among the one or more first hypotheses and the one or more second hypotheses that both exceed the decision threshold.

Example 19. The system of example 18, wherein the processor is further configured to: responsive to no hypothesis among the first set of hypotheses exceeding the decision threshold, extract one or more third hypotheses with the probability values that exceed a significant threshold, the significant threshold having a lower value than the decision threshold; responsive to no hypothesis among the second set of hypotheses exceeding the decision threshold, extract one or more fourth hypotheses with the probability values that exceed the significant threshold; maintain conflict hypotheses among the one or more first hypotheses and the one or more second hypotheses that do not both exceed the decision threshold; and maintain significant hypotheses of the one or more third hypotheses and the one or more fourth hypotheses.

Example 20. A system comprising a processor configured to perform the method of any one of examples 1 through 14.

Example 21. Computer-readable storage media comprising computer-executable instructions that, when executed, cause a processor in a vehicle to perform the method of any one of examples 1 through 14.

Example 22. Computer-readable storage media comprising computer-executable instructions that, when executed, cause a processor in a vehicle to: obtain radar tracks and vision tracks generated for an environment of the vehicle, the radar tracks being generated based on radar data from one or more radar sensors on the vehicle and the vision tracks being generated based on vision data from one or more vision sensors on the vehicle, the one or more radar sensors having a first field of view that at least partially overlaps with a second field of view of the one or more vision sensors; maintain, based on multiple scans of the radar tracks and the vision tracks, at least one set of hypotheses for associations between the vision tracks and the radar tracks, the at least one set of hypotheses including mass values for the associations between the vision tracks and the radar tracks; determine, based on the mass values, a probability value for each hypothesis of the at least one set of hypotheses, the probability value indicating a likelihood that each hypothesis is accurate; determine, based on the probability value for each hypothesis, one or more matches between one or more radar tracks and a vision track, the one or more matches comprising one or more hypotheses with probability values that exceed a decision threshold; and output, to a semi-autonomous or autonomous driving system of the vehicle, the one or more matches to control operation of the vehicle.

Conclusion

While various examples of multi-scan sensor fusion for object tracking are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a–b, a–c, b–c, and a–b–c, as well as any combination with multiples of the same element (e.g., a–a, a–a–a, a–a–b, a–a–c, a–b–b, a–c–c, b–b, b–b–b, b–b–c, c–c, and c–c–c or any other ordering of a, b, and c).

What is claimed is:

1. A method comprising:
obtaining radar tracks and vision tracks generated for an environment of a vehicle, the radar tracks being generated based on radar data from one or more radar sensors on the vehicle and the vision tracks being generated based on vision data from one or more vision sensors on the vehicle, the one or more radar sensors having a first field of view that at least partially overlaps with a second field of view of the one or more vision sensors;
maintaining, based on multiple scans of the radar data and the vision data, at least one set of hypotheses for associations between the vision tracks and the radar tracks, the at least one set of hypotheses including mass values for the associations between the vision tracks and the radar tracks;
determining, based on the mass values, a probability value for each hypothesis of the at least one set of hypotheses, the probability value indicating a likelihood that each hypothesis is an accurate association between the vision tracks and the radar tracks;
determining, based on the probability value for each hypothesis, one or more matches between one or more radar tracks and a vision track, the one or more matches comprising one or more hypotheses with probability values that exceed a decision threshold; and
outputting, to a semi-autonomous or autonomous driving system of the vehicle, the one or more matches to control operation of the vehicle.

2. The method of claim 1, the method further comprising:
assigning the mass values to the associations between the vision tracks and the radar tracks based on at least one of distances between tracks, similarities between tracks, heading information, bounding box information, object class information, velocity information, or object heading information.

3. The method of claim 2, wherein the mass values are assigned to the associations between the vision tracks and the radar tracks based on at least three of distances between tracks, similarities between tracks, heading information, bounding box information, object class information, velocity information, or object heading information.

4. The method of claim 1, wherein the at least one set of hypotheses comprises at least one of one or more radar tracks matching a vision track, a vision track matching one or more radar tracks, a radar track not matching a vision track, or a vision track not matching a radar track.

5. The method of claim 1, wherein the at least one set of hypotheses comprises a first set of hypotheses and a second set of hypotheses, the first set of hypotheses including at least one of one or more radar tracks matching a vision track and a radar track not matching a vision track, the second set of hypotheses including at least one of a vision track matching one or more radar tracks and a vision track not matching a radar track.

6. The method of claim 5, wherein determining one or more matches between one or more radar tracks and a vision track comprises:
extracting, from the first set of hypotheses, one or more first hypotheses with the probability value that exceed the decision threshold;
extracting, from the second set of hypotheses, one or more second hypotheses with the probability value that exceed the decision threshold; and
identifying the one or more matches as hypotheses among the one or more first hypotheses and the one or more second hypotheses that both exceed the decision threshold.

7. The method of claim 6, the method further comprising:
responsive to no hypothesis among the first set of hypotheses exceeding the decision threshold, extracting one or more third hypotheses with the probability values that exceed a significant threshold, the significant threshold having a lower value than the decision threshold;
responsive to no hypothesis among the second set of hypotheses exceeding the decision threshold, extracting one or more fourth hypotheses with the probability values that exceed the significant threshold;
maintaining conflict hypotheses among the one or more first hypotheses and the one or more second hypotheses that do not both exceed the decision threshold; and
maintaining the one or more third hypotheses and the one or more fourth hypotheses.

8. The method of claim 1, wherein the one or more matches are not verified in a subsequent iteration if a stability score of the one or more matches is above a threshold value, the stability score indicating a local track confidence and a temporal uncertainty associated with each match of the one or more matches.

9. The method of claim 1, wherein a window of the multiple scans of the radar tracks and the vision tracks includes the radar data and the vision data from a current sensor scan and at least one previous sensor scan.

10. The method of claim 9, wherein the window of the multiple scans steps forward by a single step in each iteration of maintaining at least one set of hypotheses for associations between the vision tracks and the radar tracks.

11. The method of claim 9, wherein the window of the multiple scans initializes with a single scan of the radar tracks and the vision tracks and accumulates additional scans of the radar tracks and the vision tracks in each iteration of maintaining at least one set of hypotheses for associations between the vision tracks and the radar tracks until the window of multiple scans reaches a predetermined window size.

12. The method of claim 1, the method further comprising:
determining, based on the mass values for the associations between the vision tracks and the radar tracks, a belief parameter and a plausibility parameter for each hypothesis of the at least one set of hypotheses; and
outputting, to the semi-autonomous or autonomous driving system of the vehicle, the belief parameter and the plausibility parameter for the one or more matches with the one or more matches to further update the one or more matches and control operation of the vehicle based on the belief parameter and the plausibility parameter for the one or more matches.

13. The method of claim 12, the method further comprising combining the mass values for the associations between the vision tracks and the radar tracks to generate a fused mass value for each association of the at least one set of hypotheses, the belief parameter and the plausibility parameter being determined based on the fused mass value.

14. The method of claim 13, wherein a Dempster-Shafer fusion process is used to combine the mass values for the associations between the vision tracks and the radar tracks.

15. A system comprising a processor configured to:
obtain radar tracks and vision tracks generated for an environment of a vehicle, the radar tracks being generated based on radar data from one or more radar sensors on the vehicle and the vision tracks being generated based on vision data from one or more vision sensors on the vehicle, the one or more radar sensors having a first field of view that at least partially overlaps with a second field of view of the one or more vision sensors;
maintain, based on multiple scans of the radar tracks and the vision tracks, at least one set of hypotheses for associations between the vision tracks and the radar tracks, the at least one set of hypotheses including mass values for the associations between the vision tracks and the radar tracks;
determine, based on the mass values, a probability value for each hypothesis of the at least one set of hypotheses, the probability value indicating a likelihood that each hypothesis is an accurate association between the vision tracks and the radar tracks;
determine, based on the probability value for each hypothesis, one or more matches between one or more radar tracks and a vision track, the one or more matches comprising one or more hypotheses with probability values that exceed a decision threshold; and
output, to a semi-autonomous or autonomous driving system of the vehicle, the one or more matches to control operation of the vehicle.

16. The system of claim 15, wherein the processor is further configured to assign the mass values to the associations between the vision tracks and the radar tracks based on at least one of distances between tracks, similarities between tracks, heading information, bounding box information, object class information, velocity information, or object heading information.

17. The system of claim 15, wherein the at least one set of hypotheses comprises a first set of hypotheses and a second set of hypotheses, the first set of hypotheses including at least one of one or more radar tracks matching a vision track and a radar track not matching a vision track, the second set of hypotheses including at least one of a vision track matching one or more radar tracks and a vision track not matching a radar track.

18. The system of claim 17, wherein the processor is configured to determine the one or more matches between one or more radar tracks and a vision track by:

extracting, from the first set of hypotheses, one or more first hypotheses with the probability value that exceed the decision threshold;

extracting, from the second set of hypotheses, one or more second hypotheses with the probability value that exceed the decision threshold; and identifying the one or more matches as hypotheses among the one or more first hypotheses and the one or more second hypotheses that both exceed the decision threshold.

19. The system of claim 18, wherein the processor is further configured to:

responsive to no hypothesis among the first set of hypotheses exceeding the decision threshold, extract one or more third hypotheses with the probability values that exceed a significant threshold, the significant threshold having a lower value than the decision threshold;

responsive to no hypothesis among the second set of hypotheses exceeding the decision threshold, extract one or more fourth hypotheses with the probability values that exceed the significant threshold;

maintain conflict hypotheses among the one or more first hypotheses and the one or more second hypotheses that do not both exceed the decision threshold; and maintain significant hypotheses of the one or more third hypotheses and the one or more fourth hypotheses.

20. A non-transitory computer-readable storage media comprising computer-executable instructions that, when executed, cause a processor in a vehicle to:

obtain radar tracks and vision tracks generated for an environment of the vehicle, the radar tracks being generated based on radar data from one or more radar sensors on the vehicle and the vision tracks being generated based on vision data from one or more vision sensors on the vehicle, the one or more radar sensors having a first field of view that at least partially overlaps with a second field of view of the one or more vision sensors;

maintain, based on multiple scans of the radar tracks and the vision tracks, at least one set of hypotheses for associations between the vision tracks and the radar tracks, the at least one set of hypotheses including mass values for the associations between the vision tracks and the radar tracks;

determine, based on the mass values, a probability value for each hypothesis of the at least one set of hypotheses, the probability value indicating a likelihood that each hypothesis is an accurate association between the vision tracks and the radar tracks;

determine, based on the probability value for each hypothesis, one or more matches between one or more radar tracks and a vision track, the one or more matches comprising one or more hypotheses with probability values that exceed a decision threshold; and output, to a semi-autonomous or autonomous driving system of the vehicle, the one or more matches to control operation of the vehicle.

* * * * *